United States Patent [19]

Konrad

[11] 4,176,339
[45] Nov. 27, 1979

[54] PROPAGATION SAMPLED ACOUSTIC LINE ARRAY

[75] Inventor: William L. Konrad, Niantic, Conn.

[73] Assignee: The United States of America as represented by the Secretary of the Navy, Washington, D.C.

[21] Appl. No.: 874,453

[22] Filed: Feb. 2, 1978

[51] Int. Cl.² ............................................. G01S 3/80
[52] U.S. Cl. .................................. 367/121; 367/129; 367/149; 367/154
[58] Field of Search ............... 340/3 T, 6 R, 7 R, 561, 340/562, 563, 564, 566, 13 R

[56] References Cited

U.S. PATENT DOCUMENTS

| | | |
|---|---|---|
| 3,668,625 | 6/1972 | Wolf et al. .......................... 340/562 |
| 3,905,008 | 9/1975 | Hagemann ........................ 340/3 T X |
| 3,921,125 | 11/1975 | Miller et al. ......................... 340/7 R |
| 3,939,466 | 2/1976 | Horwath .............................. 340/7 R |
| 4,011,540 | 3/1977 | Farr .................................... 340/7 R |

Primary Examiner—Richard A. Farley
Attorney, Agent, or Firm—Richard S. Sciascia; Arthur A. McGill; Prithvi C. Lall

[57] ABSTRACT

An acoustic line array which includes a co-axial cable having a center conductor surrounded by a flexible material of low-electrical conductivity. The flexible material is surrounded by a conducting material protected by an external shield. The cable has characteristic impedance which is sensitive to pressure variations in the medium due to a traveling acoustic pressure wave from an acoustic source. Variations in the impedance of the array are used to detect the acoustic source. Alternatively, the line array makes use of discrete sensors placed at suitable intervals along the array. This type of acoustic array eliminates the use of a plurality of wires carrying the electrical signals from the transducer to the storage equipment and elaborate multiplexing techniques.

8 Claims, 2 Drawing Figures

PROPAGATION SAMPLED ACOUSTIC LINE ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to acoustic line arrays and more particularly to a low-cost expendable acoustic line receiving array which is easily deployed and handled by virtue of its small diameter in both towed and fixed configurations.

Line acoustic receiving arrays presently in use consist of discrete acoustic sensors (hydrophone elements) spaced at intervals along the array. Such an array uses may individual hydrophones, in some cases as many as several hundred. Each hydrophone must have its output returned to the platform from which the array is deployed and where the signal processing electronics and readout equipment are located. The paths from the hydrophone to the platform end are established in some cases by simply wiring each hydrophone separately to the platform. This results in a large array diameter, typically 8 centimeters or so, with its attendant difficulties of handling and storing. Some array systems presently in use apply time or frequency multiplexing to reduce the number of conductors and hence the size of the cable. Multiplexing techniques, however, require electronics at each hydrophone location resulting in relatively high cost and lowered reliability. In either case, the individually wired array or multiplexed array, the presence of discrete hydrophone elements results in a relatively costly array vulnerable to damage to the delicate piezo-ceramic elements. Furthermore, to achieve satisfactory beam patterns, hydrophone elements must be spaced at intervals of less than half a wave length of the acoustic wave. In most cases the frequency response or directivity of the array is limited by this requirement. It is thus desirable to have an acoustic line array which is relatively inexpensive and can be easily deployed both in towed and fixed configurations.

SUMMARY OF THE INVENTION

An expendable acoustic line receiving array according to the teachings of the present invention includes a co-axial cable having a center conductor surrounded by a flexible material of low electrical conductivity. The flexible material is surrounded by a conducting material protected by an external shield. The characteristic impedance of the cable is sensitive to the pressure variations in the medium due to a traveling acoustic pressure wave from an acoustic source. Variation in the impedance of the array are used to detect the acoustic source. Alternatively, a line array makes use of discrete sensors placed at suitable intervals along the array. This type of acoustic line array eliminates the use of a plurality of wires carrying the electrical signals from the transducers to the storage equipment and/or elaborate multiplexing techniques.

An object of subject invention is to have an expendable acoustic line array which is relatively inexpensive.

Another object of subject invention is to have an acoustic line array which eliminates the use of a plurality of wires carrying the electrical signals from the discrete transducers in a typical line array to the storage equipment.

Still another object of subject invention is to have an acoustic line array which eliminates the use of elaborate multiplexing techniques.

Still another object of subject invention is to use a line array of relatively small diameter which uses a plurality of discrete sensors.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
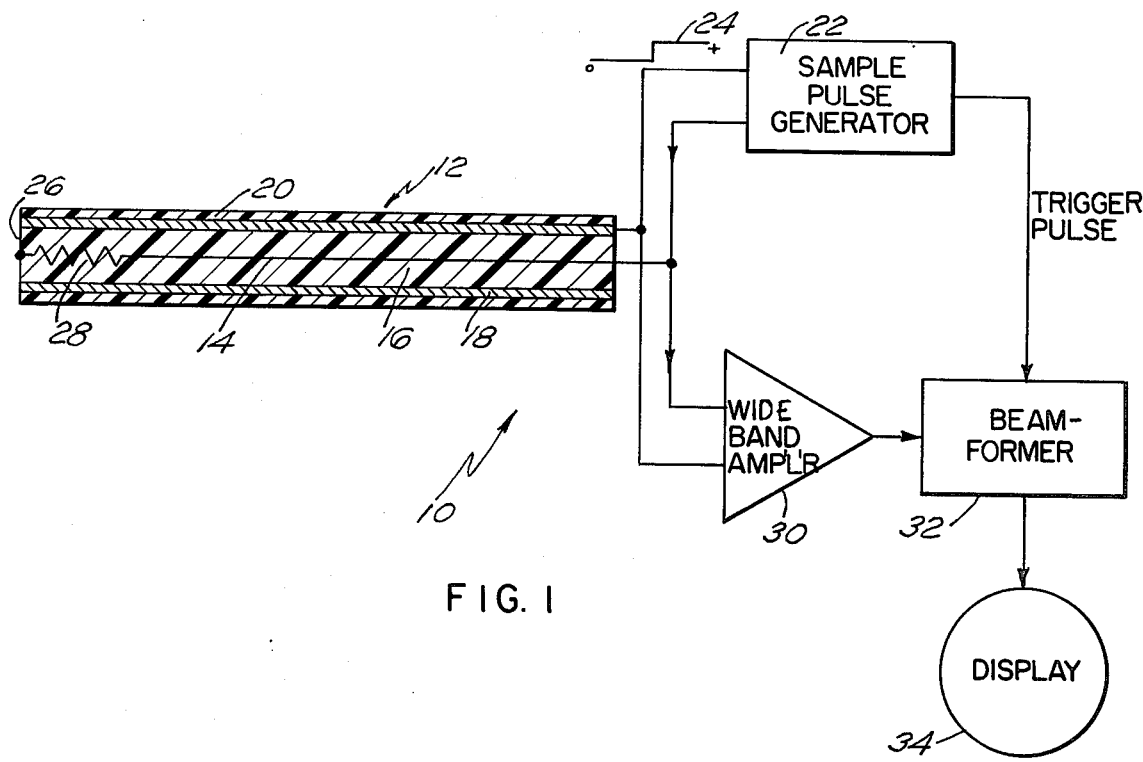
FIG. 1 is a block diagram of a propagation sampled acoustic line array of continuous type where the entire length of the array consists of a homogeneous acoustic sensor.

Referring to the drawings, FIG. 1 shows a continuous type of line array 10 which includes typically a co-axial cable 12 having a center conductor 14 surrounded by a flexible material 16 of low electrical conductivity which in turn is surrounded by a shield 18 of a conducting material. To avoid mechanical intrusion or corrosion by water, this outer shield 18 is surrounded by a suitable protective material shield 20. Co-axial cable 12 is constructed in such a manner and is of such a material that the characteristic impedance, $Z_0$, of the cable is sensitive to and can be changed by pressure applied externally to cable 12. Since acoustic energy is transmitted by pressure variations in the medium, the cable will be sensitive to these pressure variations and thus characteristic impedance of the cable 12 can be modulated by the local acoustic wave.

It is well known that if an electrical wave or pulse is introduced at one end of a transmission line or cable such as 12, discontinuity in the characteristic impedance of the line will result in partial reflections of the pulse back to the source. This technique is used in the time domain reflectometery to detect, locate and measure such discontinuities which may occur in a cable used for the transmission of electrical signals. Subject invention makes use of the reflectometery technique to detect acoustic signals, typically but not limited to underwater, sample the acoustic pressure as a function of distance from the source end of the cable and return an electrical signal containing the acoustic signal information to the source end of the cable where it can be processed to form discrete spatial receiving beams in the medium. It is commonly known that in a lossless transmission line characteristic impedance, $Z_0$ is given by $(L/C)^{\frac{1}{2}}$ where L is the inductance and C is the capacitance of the cable per unit length. Thus, if the acoustic pressure can be made to change or modulate L, C, or both at points along the cable, $Z_0$ can be changed and hence a reflection of the sampling propagating electrical pulse will occur. In practice, the capacitance C of the cable is more readily changed or modulated. If a material 16 whose dielectric constant can be varied by pressure is placed in the space between the center conductor 14 and shield 18, the capacitance of cable 12 will consequently be varied since C is directly proportional to the dielectric constant of the material between the conductors. A second means of changing the capacitance can be achieved by changing the spacing between the inner and outer conductors. Here the material 16 between the conductors would be such that it can be compressed or expanded by externally applied acoustic pressure wave. As shown in FIG. 1 depicting a continuous type of line array, a pulse generator 22 generates a sampling pulse 24 consisting of a fast rise step repeated at the required repitition rate. This pulse is fed into the line array cable 12 where it propagates to the far end 26 of the cable 12 where it is absorbed in the resistive termination by resistance 28. Reflections along the line caused by changes in the characteristic impedance, $Z_0$ return to the platform end where they are amplified by a wide band amplifier 30 and fed to the beam former 32. The beam former 32 applies the necessary delays to the return samples to form beams from broadside to end-fire. As an example, to form a broadside beam (i.e., samples in phase) the beam former 32 would apply only the line propagation time to each sample and then add the samples. Essentially simultaneous beams in other directions can be formed in the same basic manner as is presently done for conventional discrete line arrays. The output of the beam former 32 is fed to a conventional displaying unit 34.

Figure 2:
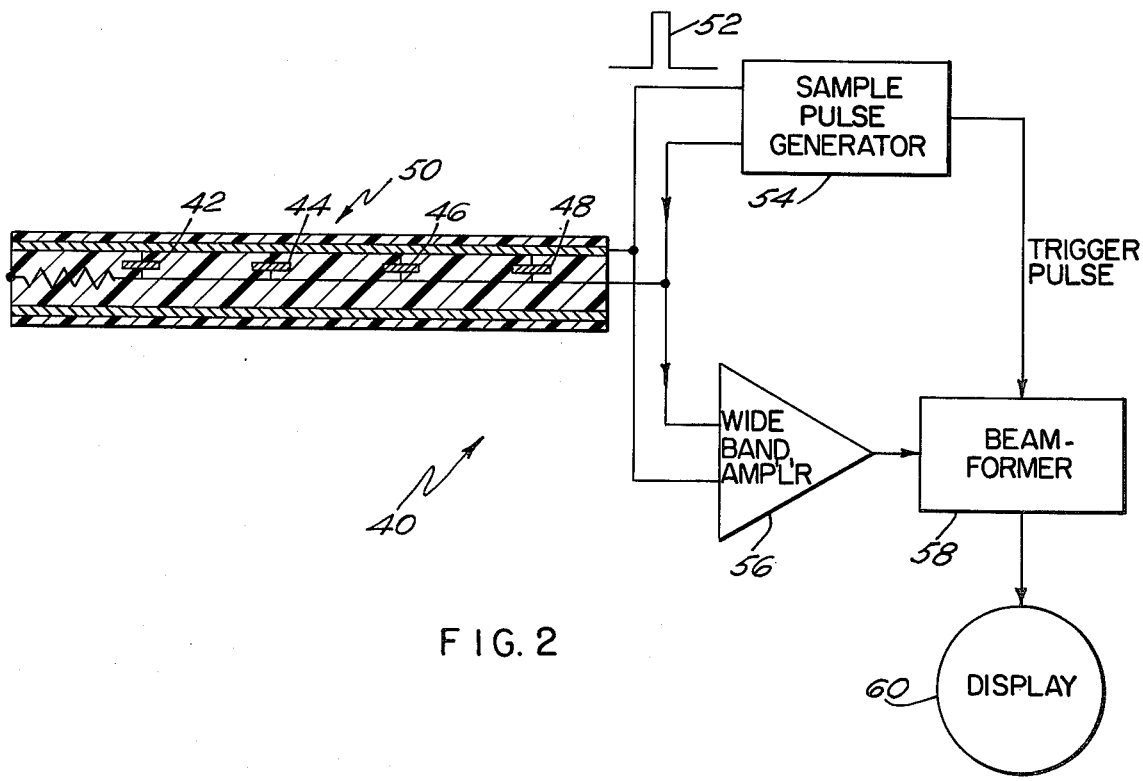
FIG. 2 is a block diagram of a propagation sampled acoustic line array which makes use of discrete sensors placed at suitable intervals along the array.

FIG. 2 shows, in block diagram form, a second embodiment of a line array built according to the teachings of subject invention. The line array 40 employs discrete hydrophone sensors such as 42, 44, 46, and 48 placed at suitable spacings along cable 50. The sensors are sampled by a propagating pulse 52 which reads out a voltage proportional to the local acoustic pressure which exists at the sensor when the propagating sampling pulse passes the sensor. In this case, the propagating pulse enables individual sensors to emit their electrical output. Alternatively, the individual sensor could introduce a discontinuity in the line impedance when the sampling pulse is present. This discontinuity will be proportional to the amplitude of the local acoustic pressure. While the discrete element array is similar to the present array in the use of discrete elements, it retains the advantage the simple time domain sampling made possible by the propagating pulse 52. The discrete sensor array as shown in FIG. 2 and the receiving system including a sampled pulse generator 54 and a wide band amplifier 56, and a beam-former 58 and a displaying unit 60 perform essentially the same functions as in the case of continuous type of line array as discussed above and as shown in FIG. 1.

It should be noted that material 16 used in the cable can be a material which is flexible and expands and contracts with pressure variations due to acoustic pressure wave or it changes its characteristic impedance. The materials suitable for such purposes are plastics such as tetrafluorethylene (Teflon) or polyethylene with air or gas in it. Furthermore, the discrete sensors used in the second embodiment can be of electret type hydrophones. The sample pulse generator used in either of the two embodiments is a conventional unit and a wide amplifier is like Hewlett-Packard HP1415A or its equivalent. The beamforming units are of the conventional type and the displayed unit is either a B-scope or its equivalent. It should be noted that the teachings of subject invention are equally applicable to a light cable such as an optical fiber instead of an electrical cable as described above. In that case, an impinging wave will introduce discontinuities in the index of refraction of the optical fiber and a light pulse instead of an electrical signal will be used for sampling purposes.

Briefly stated, a continuous acoustic line array comprises a co-axial cable having a center conductor surrounded by a flexible material of low electrical conductivity. The flexible material is surrounded by a conducting material protected by an external shield. The cable has characteristic impedance which is sensitive to pressure variations in the medium due to a traveling acoustic pressure wave from an acoustic source. Variations in the impedance of the array are used to detect the acoustic source. Alternatively, the line array makes use of discrete sensors placed at suitable intervals along the array. This type of acoustic array eliminates the use of a plurality of wires carrying the electrical signals from the transducers to the storage equipment and elaborate multiplexing techniques.

Obviously, many modifications and variations of the present invention may become apparent in the light of above teachings. As an example, the use of the choice of flexible material and the choice of the sensors can be varied without deviating from the teachings of subject invention. The ancillary units such as a pulse generator, a wide band amplifier, a beamformer and a displaying unit can be changed without deviating from the teachings of subject invention. The teachings of subject invention can also be used in case of an optical fiber wherein variations in the refractive index occur because of pressure variations due to the impinging acoustic wave and a light signal is used for sampling purposes. It is therefore understood that within the scope of the appended claims the invention may be practiced otherwise than as specifically described.

I claim:

1. An acoustic line array for detecting an acoustic source in a medium which comprises:
    a center conductor extending along the array axis for the length of the array;
    a flexible material having pressure dependent dielectric constant surrounding said center conductor;
    a conducting shield generally concentric with said center conductor;
    a resistive means for eliminating signal reflections being connected to a first end of said center conductor;
    a pulse generator being connected to second end of said center conductor, said pulse generator also generating trigger pulses;
    an amplifying means for amplifying the reflected signals being connected to the second end of the center conductor;
    a beam former having the input thereof from the output of said amplifying means and having the trigger pulses from said pulse generator for triggering thereof; and
    a displaying means being connected to the output of said beam former for displaying the output thereof.

2. The acoustic line array of claim 1 wherein said resistive means being connected to the first end of said center conductor is a terminating resistor for eliminating reflections of a signal from said pulse generator at the first end of said center conductor.

3. The acoustic line array of claim 2 wherein said conducting shield is surrounded by a protective shield.

4. The acoustic line array of claim 1 wherein said pulse generator is connected to said beam former for providing a trigger pulse to said beam former.

5. The acoustic line array of claim 3 wherein said amplifying means is a wide band amplifier.

6. The acoustic line array of claim 1 wherein said flexible material is tetrafluoroethylene.

7. The acoustic line array of claim 1 wherein a plurality of acoustic sensors are housed along the length of said center conductor.

8. The acoustic line array of claim 7 wherein said plurality of acoustic sensors are of electret type.

* * * * *